United States Patent
Abma (10) Patent No.: US 8,103,453 B2
(45) Date of Patent: Jan. 24, 2012

(54) METHOD OF SEISMIC DATA INTERPOLATION BY PROJECTION ON CONVEX SETS

(75) Inventor: Raymond L. Abma, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 400 days.

(21) Appl. No.: 12/464,907

(22) Filed: May 13, 2009

(65) Prior Publication Data

US 2009/0292476 A1    Nov. 26, 2009

Related U.S. Application Data

(60) Provisional application No. 61/054,878, filed on May 21, 2008.

(51) Int. Cl.
  *G01V 1/00* (2006.01)
  *G06G 7/58* (2006.01)
(52) U.S. Cl. .............. 702/16; 703/10; 367/73
(58) Field of Classification Search .............. 702/16, 702/1–2, 5, 14, 17, 81, 84–85, 106, 189–191, 702/193–194; 703/2, 5, 10; 367/14–15, 367/21, 37–38, 48–49, 57, 68–69, 73
See application file for complete search history.

(56) References Cited

U.S. PATENT DOCUMENTS

| 6,327,537 B1 | 12/2001 | Ikelle |
| 2005/0190650 A1 | 9/2005 | Ferber |
| 2008/0033655 A1 | 2/2008 | Ozbek et al. |

FOREIGN PATENT DOCUMENTS

WO    WO 2005066661    7/2005

OTHER PUBLICATIONS

Marlinverno et al., The Reconstruction of Subsurface Property Maps Using Projection onto Convex Sets, 1994 IEEE, pp. V-313 to V-316.*
Menke, W., Applications of the POCS Inversion Method to Interpolating Topography and Other Geophysical Fields, Mar. 1991, Geophysical Research Letters, vol. 18, No. 3, pp. 435-438.*
Li et al., Recovery of Acoustic Impedance by POCS Technique, Jun. 1991, China 1991 International Conference on Circuits and Systems, pp. 820-823.*
Abma, et al., "3D Interpolation of Irregular Data With a POCS Algorithm", Nov./Dec. 2006, pp. E91-E97, vol. 71, No. 6, Publisher: Geophysics, Published in: US.

(Continued)

*Primary Examiner* — Michael Nghiem
*Assistant Examiner* — Toan M Le
(74) *Attorney, Agent, or Firm* — Albert K. Shung (57) ABSTRACT

According to a preferred aspect of the instant invention, there is provided herein a system and method for Interpolation of seismic data with a POCS (projection onto convex sets) algorithm that can produce high quality interpolation results, at a reduced computational cost. In particular, optimizing the threshold calculations, allowing for aliased data, allowing the algorithm to skip unneeded Fourier transforms, and parallelization makes the method more practical and robust. Robust interpolation of aliased data may be done by limiting the calculations of the beginning iterations to the lowest temporal and spatial frequencies included in the data, then gradually allowing higher temporal and spatial frequencies into the following iterations.

15 Claims, 5 Drawing Sheets

OTHER PUBLICATIONS

Bjarnason, et al., "Application of the POCS Inversion Method to Cross-Borehole Imaging", Jul. 1993, pp. 941-948, vol. 58, No. 7, Publisher: Geophysics, Published in: US.

Barnes, Arthur E., "When the Concepts of Spectral Frequency and Instantaneous Frequency Converge", Oct. 1993, pp. 1020-1023, vol. 12, No. 10, Publisher: American Geological Institute, Published in: US.

Bjarnason, "Seismological Studies in South Iceland (Seismology, Tomography, Oceanic Ridge, Transform Zone)", 1992, pp. 138 vol. 5401B, Publisher: Dissertations Abstracts International, Published in: US.

Herrmann, et al., "Non-Parametric Seismic Data Recovery With Curvelet Frames", Apr. 2008, pp. 233-248, vol. 173, No. 1, Publisher: Geophysical Journal International, Published in: US.

Howe, et al., "Independent Simultaneous Sweeping—A Method to Increase the Productivity of Land Seismic Crews", Feb. 7, 2008, Publisher: ISS, Published in: US.

Abma, et al., "Making POCS Interpolation Practical", Feb. 20, 2008, Published in: US.

Galloway, et al., "POCS Method for Seismic Data Reconstruction of Irregularly Sampled Data", 2007, Publisher: 2007 CSPG CSEG Convenion, Published in: Canada.

Li, et al., "Recovery of Acoustic Impedance by POCS Technique", Jun. 17, 1991, pp. 820-823, vol. 2, Published in: China.

Petroleum Abstracts, Publisher: The University of Tulsa, Published in the US, Mar. 1991, thru Aug. 28, 2007, 16 pages.

Ozdogan Yilmaz, "Seismic Data Processing", Society of Exploration of Geophysicists, 1987, Chapter 1, pp. 9-81, Tulsa, Oklahoma, USA.

Ozdogan Yilmaz, "Seismic Data Processing", Society of Exploration of Geophysicists, 1987, Chapter 6, pp. 384-427, Tulsa, Oklahoma, USA.

* cited by examiner

METHOD OF SEISMIC DATA INTERPOLATION BY PROJECTION ON CONVEX SETS

RELATED CASE

This application claims the benefit of U.S. Provisional Patent Application Ser. No. 61/054,878 filed on May 21, 2008, and incorporates said provisional application by reference into this disclosure as if fully set out at this point.

TECHNICAL FIELD

This invention relates to the general subject of seismic exploration and, in particular, to methods for estimating seismic and other signals that are representative of the subsurface.

BACKGROUND OF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2D) seismic survey, the recording locations are generally laid out along a single line, whereas in a three dimensional (3D) survey the recording locations are distributed across the surface in a grid pattern. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. Chapter 1, pages 9-89, of *Seismic Data Processing* by Ozdogan Yilmaz, Society of Exploration Geophysicists, 1987, contains general information relating to conventional 2D processing and that disclosure is incorporated herein by reference. General background information pertaining to 3D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3D survey are amenable to viewing in a number of different ways. First, horizontal "constant time slices" may be taken extracted from a stacked or unstacked seismic volume by collecting all of the digital samples that occur at the same travel time. This operation results in a horizontal 2D plane of seismic data. By animating a series of 2D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2D seismic line from within the 3D data volume. It should also be noted that a 3D dataset can be thought of as being made up of a 5D data set that has been reduced in dimensionality by stacking it into a 3D image. The dimensions are typically time (or depth "z"), "x" (e.g., North-South), "y" (e.g., East-West), source-receiver offset in the x direction, and source-receiver offset in the y direction. While the examples here may focus on the 2D and 3D cases, the extension of the process to four, five, or six dimensions is straightforward.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

One well known problem with seismic data, though, is that in many cases it is impractical or impossible to acquire data in some limited parts of a planned survey, i.e., there may be skips, gaps, or localized regions of overwhelming noise that result in gaps in the seismic coverage and/or fold. Those of ordinary skill in the art will be very familiar with the sorts of field problems that can result in low fold data including regions of localized noise (due, e.g., to the presence of a highway, electrical lines/generators, construction), regions where seismometers cannot be placed (e.g., because of surface water such as lakes), inability to permit a parcel of land, etc.

Additionally, in some cases it is impractical or impossible to acquire regularly spaced traces in some parts of the survey area. That is, rather than obtaining uniformly and equally spaced shot/receiver spacings that are collected exactly as they were planned in the office of the explorationist, the actual collection of data in the field may result in irregular spacing of shots, receivers or both. This results in a wavefield that is sampled irregularly. This irregular sampling can cause artifacts in seismic images that were produced by using processing algorithms that presuppose a regularly sampled wavefield.

Many seismic processing algorithms (e.g., migration) work best when the input data are regularly sampled spatially and are of full fold, i.e., where the data do not have skips, gaps, etc. To that end, a variety of interpolation schemes have been devised that are designed to use existing trace data to estimate the signal content of traces that are missing or corrupted. Among those that have been utilized with some success are a class of estimators known as "Projection Onto Convex Sets" ("POCS", hereinafter) interpolation algorithms.

However, as useful as POCS has proven to be, its application in practice has added a significant amount of time and cost to the processing of the seismic data because of the computer resources that are required to calculate it. That is, this method of interpolation is computationally intensive and, although many datasets that could benefit from an application of this technique, its application has occasionally been avoided to save time and computer resources in the processing of the data.

Heretofore, as is well known in the seismic processing and seismic interpretation arts, there has been a need for a method of estimating seismic signal values in regions of missing coverage that produced a good interpolation and that can be applied to large seismic datasets. Additionally, there has been a need for an interpolation method that is capable of taking advantage of the higher dimensionality of seismic data, something which has not been done heretofore, as most prior art interpolation methods have tended to focus on only two dimensions of the seismic data. Accordingly, it should now be recognized, as was recognized by the present inventor, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a preferred aspect of the instant invention, there is provided herein a system and method for interpolating 2D, 3D, or higher dimension seismic data to create datasets that are regular in coverage and/or fold which substantially reduces the amount of computation that would have been required heretofore. In brief, the instant invention reduces the number of iterations that would otherwise be required by a factor three to five by thresholding the data according to the method disclosed herein. In particular, according to a preferred embodiment, the instant invention will preferably be implemented in connection with, for example, a 3D seismic dataset as follows:

Calculate a 3D Fast (or discrete) Fourier Transform ($k_x$, $k_y$, $k_z$) on the seismic data set;

Compute the magnitude (e.g., a value times its complex conjugate) of the complex Fourier samples in the 3D transform;

Form a histogram of the magnitudes;

Divide the histogram into intervals of approximately equal energy;

Select thresholds using histogram boundaries; and,

Use the thresholds in the POCS interpolation process to estimate missing seismic data.

Note that, contrary to the prior art approach, the thresholds that are determined according to the instant invention will not be equally spaced. One consequence of this approach is the run time of POCS interpolation will be dramatically reduced.

According to still another preferred embodiment, a robust interpolation of aliased data may be performed by restricting the calculations during the initial iterations to the lowest temporal and spatial frequencies found in the data, and then gradually allowing higher temporal and spatial frequencies into the following iterations.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DETAILED DESCRIPTION

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

General Environment of the Invention

Figure 1:
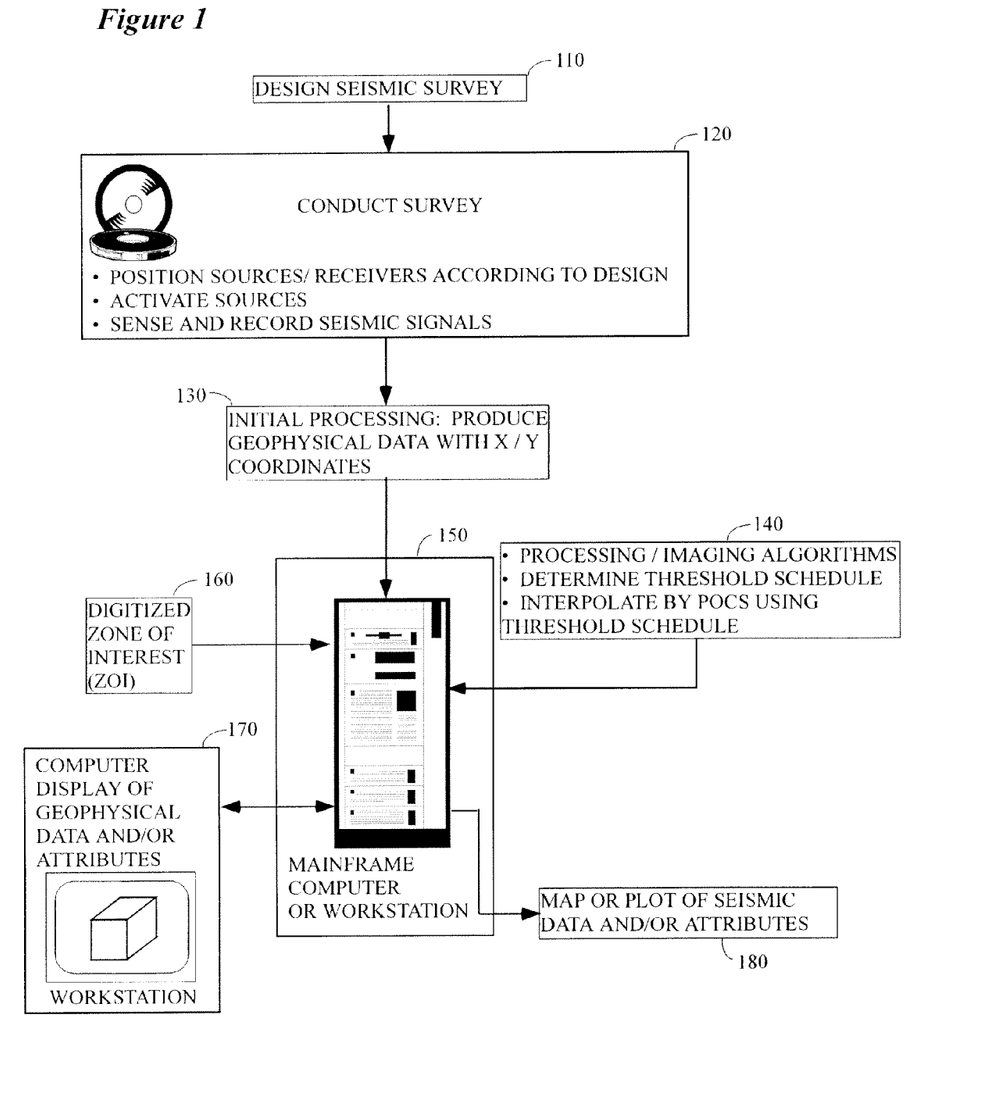
FIG. 1 illustrates the general environment of the instant invention.

FIG. 1 illustrates the general environment in which the instant invention would typically be used. A seismic survey is designed 110 by the explorationist to cover an area of economic interest. Field acquisition parameters (e.g., shot spacing, line spacing, fold, etc.) are typically selected in conjunction with this step, although it is common to modify the ideal design parameters slightly (or substantially) in the field to accommodate the realities of conducting the survey.

Seismic data are collected in the field 120 over a subsurface target of potential economic importance and are typically sent thereafter to a processing center 150 where they will be processed for use in exploration. In some cases, there may be some initial data processing performed in the field and this is becoming more common and feasible given the computing power that is available to field crews.

In the processing center a variety of preparatory processes 130 are applied to the seismic traces to make them ready for use by the methods disclosed hereinafter. The processed traces would then be made available for use by the instant invention and might be stored, by way of example only, on hard disk, magnetic tape, magneto-optical disk, DVD disk, or other mass storage means.

The methods disclosed herein would best be implemented in the form of a computer program 140 that has been loaded onto a programmable computer 150 where it is accessible by a seismic interpreter or processor. Note that the programmable computer 150 would typically include, in addition to mainframes, workstations, and supercomputers, computers that provide for parallel and massively parallel computations, wherein the computational load is distributed between two or more processors. As is also illustrated in FIG. 1, in a typical processing sequence, some sort of digitized zone of interest model 160 may be specified by the user and provided as input to the processing computer program. In the case of a 3D seismic section, the zone of interest model 160 would typically include specifics as to the lateral extent and thickness (which might be variable and could be measured in time, depth, frequency, etc.) of a subsurface target. The exact means by which such zones are created, picked, digitized, stored, and later read during program execution is unimportant to the instant invention and those skilled in the art will recognize that this might be done any number of ways.

A program 140 embodying the instant invention might be conveyed into the computer that is to execute it by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network. In a typical seismic processing environment, the methods of the instant invention would be made part of a larger package of software modules that is designed to perform many of the processing steps listed in FIG. 2. After processing by the instant methods, the resulting traces would then typically be sorted into gathers, stacked, and displayed either at a high resolution color computer monitor 170 or in hard-copy form as a printed seismic section or a map 180. The seismic interpreter would then use the displayed images to assist him or her in identifying subsurface features conducive to the generation, migration, or accumulation of hydrocarbons.

Figure 2:
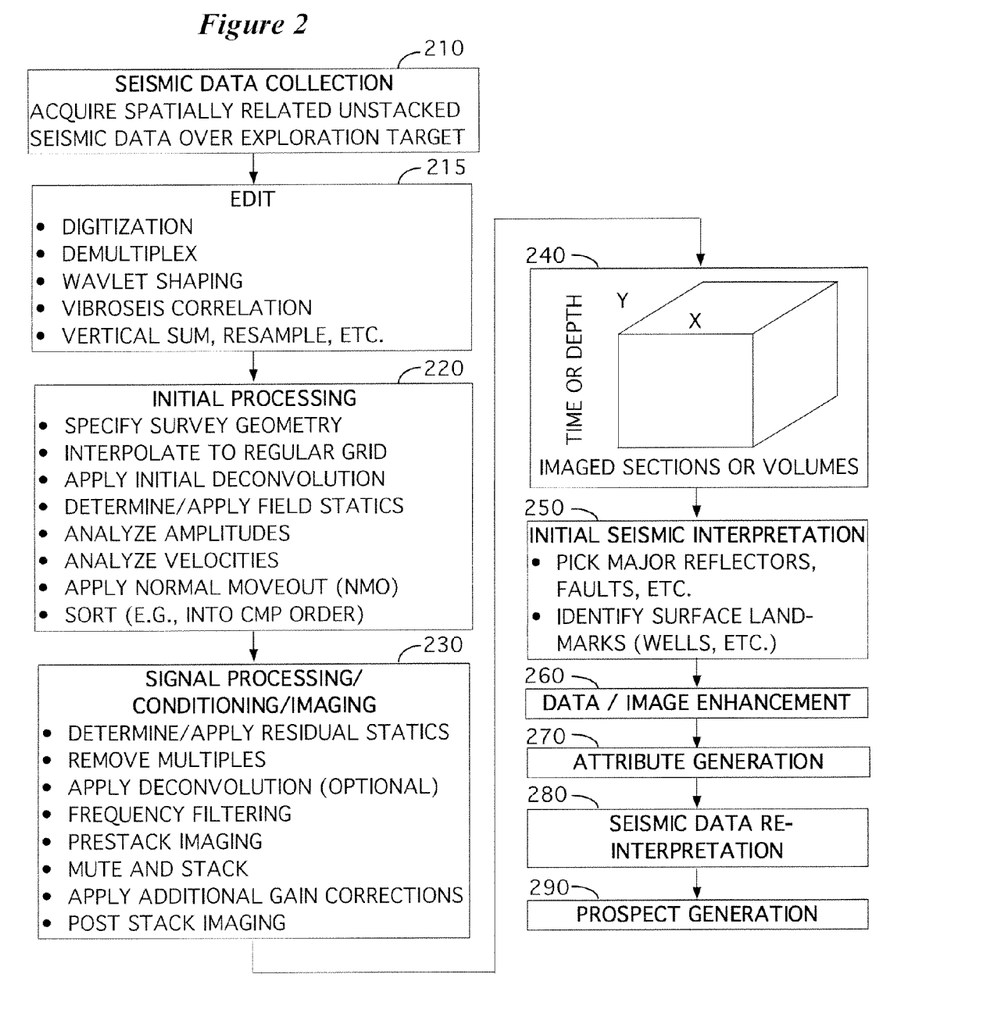
FIG. 2 illustrates a seismic processing sequence suitable for use with the instant invention.

As was indicated previously, the instant invention will preferably be made a part of and incorporated into a conventional seismic processing sequence of the sort generally described in FIG. 2. Those of ordinary skill in the art will recognize that the processing steps illustrated in FIG. 2 are only broadly representative of the sorts of processes that might be applied to such data and the choice and order of the processing steps, and the particular algorithms and parameters involved, may vary markedly depending on the individual seismic processor, the signal source (dynamite, vibrator, etc.), the survey location (land, sea, etc.) of the data, the company that processes the data, etc.

As a first step, and as is generally illustrated in FIG. 2, a 2D or 3D seismic survey is conducted over a particular volume of the earth's subsurface (step 210). The data collected in the field consist of unstacked (i.e., unsummed) seismic traces which contain digital information representative of the volume of the earth lying beneath the survey. Methods by which such data are obtained and processed into a form suitable for use by seismic processors and interpreters are well known to those of ordinary skill in the art.

The purpose of a seismic survey is to acquire a collection of spatially related seismic traces over a subsurface target of some potential economic importance. Data that are suitable for analysis by the methods disclosed herein might consist of, for purposes of illustration only, an unstacked 2-D seismic line, an unstacked 2-D seismic line extracted from a 3D seismic survey or, preferably, an unstacked 3D portion of a 3D seismic survey, or a 4D, 5D, or 6D survey, etc. The invention disclosed herein is most effective when applied to a group of stacked seismic traces that have an underlying spatial relationship with respect to some subsurface geological feature. Again for purposes of illustration only, the discussion that follows will be couched in terms of traces contained within a 3-D survey (stacked or unstacked as the discussion warrants), although any assembled group of spatially related seismic traces could conceivably be used.

After the seismic data are acquired (step 210), they are typically taken to a processing center where some initial or preparatory processing steps are applied to them. As is illustrated in FIG. 2, a common early step 215 is designed to edit the input seismic data in preparation for subsequent processing (e.g., demux, gain recovery, wavelet shaping, bad trace removal, etc.). This might be followed by specification of the geometry of the survey (step 220) and storing of a shot/receiver number and a surface location as part of each seismic trace header. Once the geometry has been specified, it is customary to perform a velocity analysis and apply an NMO (normal move out) correction to correct each trace in time to account for signal arrival time delays caused by offset.

In some preferred arrangements, the instant invention might best be utilized in connection with step 220, e.g., as a means of interpolating the unstacked (or stacked) seismic data to a regular grid. That being said, although the instant invention could readily be applied as part of step 220 of the processing sequence of FIG. 2, those of ordinary skill in the art will recognize that there are many other points in a typical processing sequence that could be improved through the use of the instant invention. Those of ordinary skill in the art will appreciate that a method such as that taught herein has many other applications besides interpolation of unstacked seismic traces to a regular grid.

After the initial pre-stack processing is completed, it is customary to condition the seismic signal on the unstacked seismic traces before creating stacked (or summed) data volumes (step 230). In FIG. 2 step 230 contains a typical "Signal Processing/Conditioning/Imaging" processing sequence, but those skilled in the art will recognize that many alternative processes could be used in place of the ones listed in the figure. In any case, the ultimate goal from the standpoint of the explorationist is the production of a stacked seismic volume or, in the case of 2D data, a stacked seismic line for use in the exploration for hydrocarbons within the subsurface of the earth.

As is further suggested in FIG. 2, any digital sample within a stacked seismic volume is uniquely identified by a (X, Y, TIME) triplet, with the X and Y coordinates representing some position on the surface of the earth, and the time coordinate measuring a recorded arrival time within the seismic trace (step 240). For purposes of specificity, it will be assumed that the X direction corresponds to the "in-line" direction, and the Y measurement corresponds to the "cross-line" direction, as the terms "in-line" and "cross-line" are generally understood in the art. Although time is a preferred and most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques.

The explorationist may do an initial interpretation 250 of the resulting stacked volume, wherein he or she locates and identifies the principal reflectors and faults wherever they occur in the data set. This might be followed by additional data enhancement 260 of the stacked or unstacked seismic data and/or attribute generation (step 270) therefrom. In many cases the explorationist will revisit his or her original interpretation in light of the additional information obtained from the data enhancement and attribute generation steps (step 280). As a final step, the explorationist will typically use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons (i.e., prospect generation 290).

Preferred Embodiments

According to a first preferred embodiment of the instant invention, there is provided a method of interpolating seismic signals that performs this operation more efficiently than has been done heretofore.

By way of general background, the method of Projection Onto Convex Sets (POCS) is a general technique that has been used in many different contexts. Of particular interest in the field of seismic processing is the use of POCS in connection with interpolating missing data and creating regularized seismic surveys (collectively "interpolation", hereinafter). In brief, those of ordinary skill in the art will recognize that many seismic algorithms require full fold and/or regularly sampled data and POCS has been used heretofore to interpolate seismic data for these sorts of purposes.

Although POCS can provide high quality interpolations, its computationally intensive nature has tended to limit its application to datasets to which substantial computing resources could be dedicated. However, the instant inventor has discovered a method of accelerating the POCS calculation substantially.

The cost of interpolation via POCS depends directly on the number of iterations that must be performed before convergence to a final answer is reached. Thus, it should be clear that one preferred way to reduce the cost of this computation is to reduce the total number of iterations. Although it is typically the case that a POCS calculation requires many hundreds of iterations, the instant invention obtains the similar results with substantially fewer iterations by manipulating the threshold values that are used in the calculation.

By way of explanation, the term "threshold schedule" has traditionally described one aspect of the POCS calculation algorithm. Generally speaking, and as is described in greater detail below, the threshold schedule indicates how the threshold value is to be modified at each iteration. Typically, and speaking for purposes of illustration of a Fourier transform amplitude spectrum, the threshold value is decreased at each iteration and eventually reaches zero (or near that value). Of course, threshold values that are near zero correspond to cases where all (or most all) of the spectrum of every trace is used in the interpolation computation.

Figure 8:
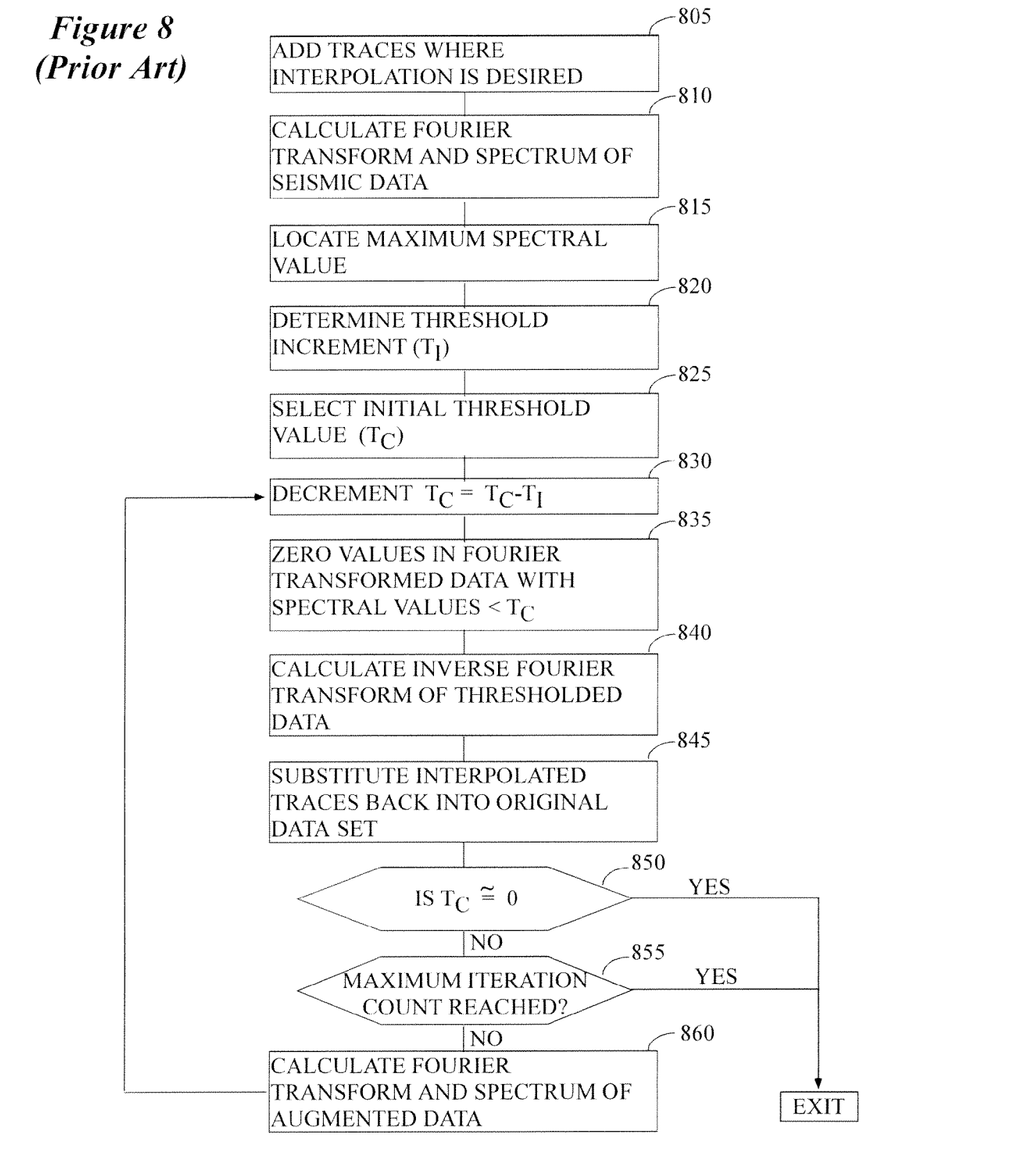
FIG. 8 contains a flowchart embodiment of a prior art POCS algorithm.

In broadest terms, the prior art POCS as it applies to seismic data operates generally a follows (refer to FIG. 8 for a typical flowchart):

a. As an initial step, seismic traces that are zero filled are inserted into the seismic survey at locations where it is desired to obtain interpolated data (step 805). Of course, in those cases where a seismic trace is to be interpolated because of the presence of a noise burst and that noise bursts does not extend throughout the entire trace (or where partial traces of other sorts are available), it is certainly possible that only the noisy sections of the trace might be replaced with a constant value such as zero. In most instances, the edges of the regions containing zero-filled traces are smoothed to reduce the effect of Fourier wraparound. In other scenarios, edge smoothing will not be performed, with the zeroed traces being used as an indicator to the instant algorithm that the edge of the actual data has been reached.

b. A 2D (or 3D, 4D, etc., depending on the data that is to be interpolated) Fourier transform (e.g., a fast Fourier transform or a discrete Fourier transform) is next calculated (step 810). In the event that the data are 3D, the Fourier transform will be taken over all three axes ($k_x$, $k_y$, $k_z$). Note that the 3D transform may not be taken over the entire survey but, instead, could be calculated by a moving window of, say, 25 by 25 traces laterally and 100 to 500 samples in time. Obviously, utilizing windows such as this and dividing the entire survey into smaller windows would make the calculation that is required to update the Fourier transform at each iteration much more tractable.

c. The Fourier components (e.g., complex magnitude) of each window are calculated from the Fourier transformed data values (step 810);

d. The maximum energy value of the Fourier components (as measured over all samples in the Fourier transformed dataset) is determined (step 815);

e. The threshold increment is calculated (step 820). As a rule of thumb, according to a prior art approach, the maximum spectral value is divided by the predetermined number of iterations that it is desired to run the algorithm to yield the threshold increment. For example, if the maximum energy value of the Fourier components is 10,000 and a maximum of 1000 iterations are to be performed, the threshold increment would be calculated to be (10,000/1000)=10;

f. An initial threshold value will be selected which typically would be the maximum energy value that can be found within the Fourier components (step 825). The threshold value for each iteration is then conventionally calculated by decrementing the threshold value used in the previous iteration by a constant amount equal to the threshold increment (step 830);

g. Within the Fourier transformed data, the Fourier samples that have energy magnitude less than the current threshold are set to zero to create a modified Fourier transformed dataset (step 835);

h. The modified Fourier transformed dataset is inverse transformed (step 840);

i. Each (partially) interpolated trace from the inverse transformed dataset is substituted back into the original dataset to create a modified dataset (step 845). This creates an augmented dataset that contains the original traces and the partially interpolated traces;

j. If the current threshold is about equal to zero (step 850), the maximum iteration count has been reached (step 855), or convergence has been obtained, the process is terminated, else, the time-domain data including the current estimates of the interpolated traces (the augmented dataset) is retransformed (step 860); and, k. A new threshold value is calculated by decrementing the previous threshold value by a constant amount equal to the threshold increment, after which the algorithm returns to step (g) (step 860).

Note that the foregoing is the general approach utilized by prior art POCS seismic algorithms. The instant invention modifies this approach as follows.

Rather than utilizing a constant threshold increment which, in effect, imposes a linear decrease on the value of the threshold at each iteration, the instant invention calculates a nonlinear threshold schedule that is a function of the energy distribution in the Fourier transform domain. FIGS. 3 through 7 illustrate some principal steps in the process of creating a threshold schedule in greater detail.

Figure 3:
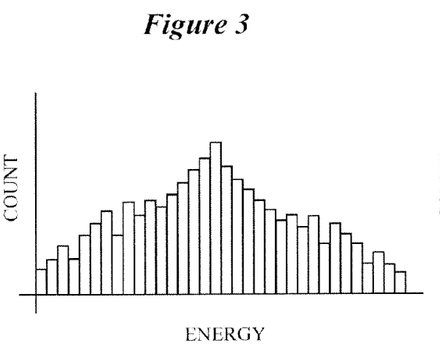
FIG. 3 contains a general illustration of an energy histogram suitable for use with the instant invention.

As a first preferred step and as is generally indicated in FIG. 3, the energy of each Fourier transform coefficient in the dataset will be formed into a histogram. Note that this histogram will typically contain many millions of data values. In some preferred embodiments, the entire 3-D array of magnitudes will be sorted (e.g., low to high) and thereafter formed into a histogram according to methods well known to those of ordinary skill in the art. Other preferred variations, will utilize "binning" wherein each magnitude is converted to an integer bin number that is added to the appropriate histogram interval/bin. Still other preferred variations will utilize a histogram that has been formed from a sample that has been drawn from the full survey or some portion of it, etc. Those of ordinary skill in the art will be able to device many alternative ways of obtaining information about the distribution of magnitudes.

Figure 4:
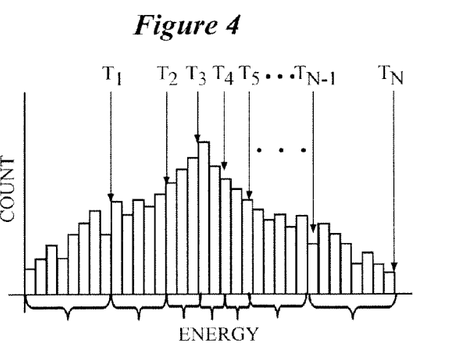
FIG. 4 illustrates schematically how thresholds might be chosen.
Figure 5:
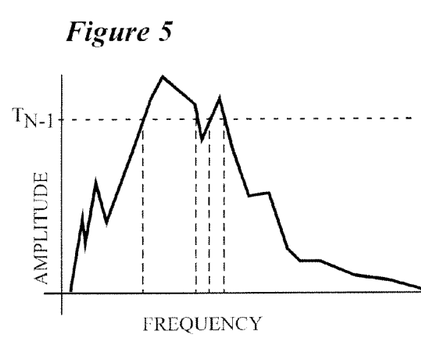
FIG. 5 contains an illustration of a typical seismic frequency spectrum.

As a next preferred step, the locations in the histogram that approximately divide it into equal energy intervals will be identified (e.g., FIG. 4). As is suggested in this figure, assuming that the number of intervals is equal to "N", the instant invention will select a series of values $(T_1, T_2, T_3, \ldots T_N)$ that divide the histogram up into equal energy intervals. That is, in one preferred embodiment the histogram bin count between $T_1$ and $T_2$, will be the same as the bin count between $T_2$ and $T_3, \ldots, T_{N-1}$ and $T_N$. This relationship actually means that for this seismic survey the series of values $(T_1, T_2, T_3, \ldots T_N)$ are at least approximately equal energy steps. In some preferred embodiments, $T_N$ will at least approximately equal the maximum observed complex magnitude value. A threshold schedule calculated according to the instant invention will not consist of uniformly spaced values.

The previous step illustrates a key aspect of the instant invention. The instant inventor has discovered that if a threshold schedule is utilized that takes at least approximately equal energy steps, the number of iterations that is required in order to utilize POCS to interpolate seismic data will be greatly reduced, in some cases it will be reduced by a factor of 3 to 5.

Figure 6:
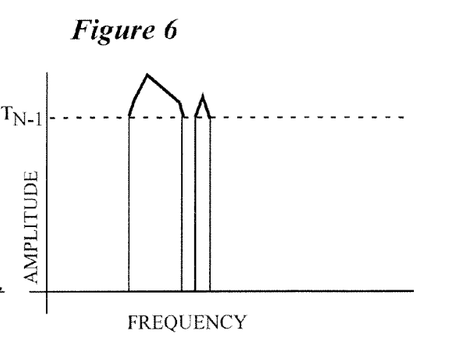
FIG. 6 illustrates how this spectrum might appear after thresholding using $T_{N-1}$.
Figure 7:
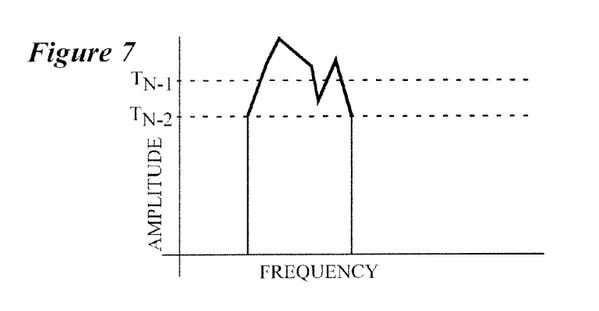
FIG. 7 illustrates how the spectrum of FIG. 5 might appear after thresholding using $T_{N-2}$.

Finally, each threshold value, $T_i$, will be used in turn within an iteration of the POCS calculation. As is broadly suggested in FIGS. 5, 6, and, 7 when $T_{N-1}$ is chosen to be the threshold value, preferably only those Fourier frequency components whose values are greater than or equal to $T_{N-1}$ will be left unchanged. All others will preferably be set equal to zero. FIG. 6 illustrates how this might appear for one seismic trace spectrum. FIG. 7, then, illustrates how a lower threshold value $(T_{N-1})$ will leave more non-zero values in the transformed data. Obviously, continuing to reduce the threshold in this manner will eventually result in all of the Fourier transformed data being used in the interpolation process if the algorithm is allowed to iterate through the entire threshold schedule.

Figure 10:
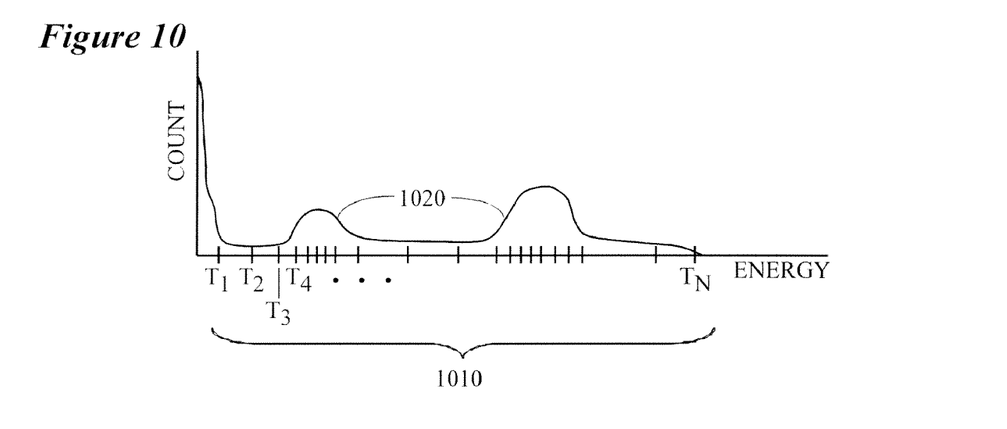
FIG. 10 illustrates further how thresholds might be chosen in some preferred embodiments.

By way of further illustration, consider the distribution of energies and threshold choices 1010 illustrated in FIG. 10. Given this sort of energy distribution, there are many zero and near-zero samples, but when taken together they have little energy. Of course, events of different strengths may show up as different sets of events on the histogram. In the preferred embodiment, and as is explained in greater length below, using the threshold 1010 progression that is suggested by this figure would focus the computations on the energies lying within the two major events 1020 and much less time/computing effort would be spent in those portions of the distribution which contribute little to the recorded seismic signal.

Figure 9:
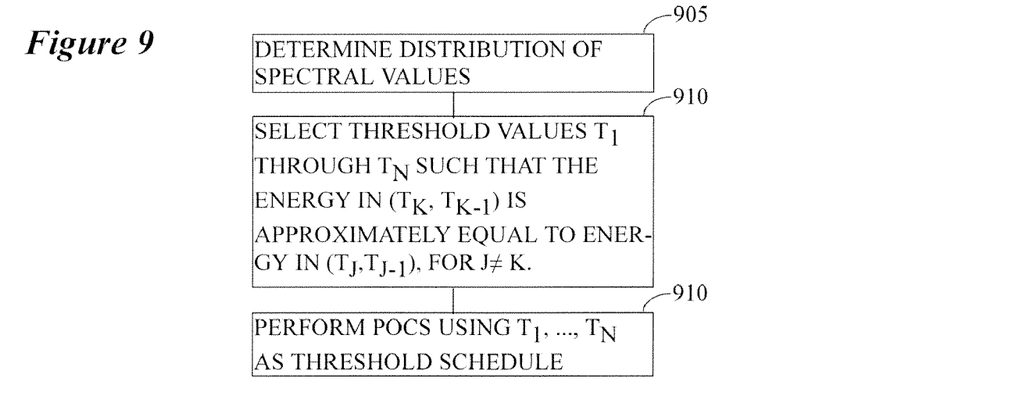
FIG. 9 contains a flow chart of the preferred method of calculating a threshold sequence.

Finally, FIG. 9 contains a flowchart that illustrates some preferred steps the threshold calculation. It is assumed for purposes of FIG. 9 that a Fourier transformed dataset (and its corresponding magnitude) is available as input.

Given that input data, a distribution of the energy values of the Fourier components will be determined (step 905) as has been discussed previously. Note that in some cases a full histogram based on the entirety of the energy values in the survey will be computed. In other instances, a histogram based on a sub-sample of the spectral values might be computed. In still other instances, the quantiles of the distribution might be determined using routines that have been developed especially for that purpose (e.g., that do not require sorting or storing the seismic spectral data values).

Next, a threshold schedule $(T_1, \ldots, T_N)$ will be selected based on the distribution of energy valued of the Fourier components. In the preferred arrangement, the threshold schedule will be determined such that the energy content is approximately the same between any two thresholds. That is, the $T_i$ will preferably be selected such that the spectral energy content in the interval $(T_K, T_{K-1})$ is at least approximately equal to the energy content in $(T_J, T_{J-1})$, for $J \neq K$.

Finally, the threshold schedule will preferably be used in a POCS algorithm for purposes of estimating missing seismic data traces for subsequent use in geophysical exploration for subsurface oil and minerals.

The instant threshold schedule is believed to be more efficient than those utilized previously because the POCS algorithm is allowed to spend most of its iterations on sample intervals containing the most energy and less time is spent computing on sample intervals that contain relatively little energy. Under the instant scheme, the number of iterations that would typically be required in a POCS-type algorithm may be reduced by a factor of three to five, thereby tending to reduce the computer run time by the same factor.

The incremental cost of doing a POCS calculation according to the instant invention is relatively small if done properly. The main incremental cost, i.e., that of calculating the threshold schedule, is associated with sorting the square of the Fourier spectral sample values prior to organizing them into a histogram. Fortunately, the cost of the sort is small for a typical 3D sub-volume. Thus, in this embodiment picking the proper sort algorithm is particularly important. For example, a sort that works in less than a second for a small number of elements, say a few tens of thousands, could take most of a day when the number of elements is increased to several million. This cost can be reduced by changing the sort algorithm, or subsampling the input data used to calculate calculating the threshold schedule, etc Although POCS can interpolate aliased signals, some care must be taken for it to do so reliably. For example, in the case where every other trace is zero, the pattern of dead traces is strong and will be preserved in the output unless some effort is made to force a more desirable—and reasonable—solution.

One possible way of forcing POCS to ignore pattern gaps such as this is to kill the values at the spatial Nyquist. However, this approach will fail in the case of some other regularity of missing traces, such as instances where one out of every third trace is missing, etc.

According to another preferred embodiment, a more robust method that handles general regularities in missing traces and that will tend to preserve the values at the spatial Nyquist would be to start the iterations down weighting or using only the low temporal and spatial frequencies and adding the high frequencies back in later, e.g., after the low frequency solution has converged or at least partially converged. The effect of these weights is similar in general concept to methods where the interpolation of the high frequencies is controlled by the low frequencies. A combination of these weights and killing the spatial Nyquist frequency might be utilized to force the POCS algorithm to ignore the every-other-trace pattern.

Prior art interpolation schemes typically require that entire interpolated traces be generated. If entire traces are assumed to be dead, some time may be saved by performing the Fourier transforms in time only once. For example, if a 3D volume is to be interpolated, the simplest implementation would be to apply a 3D Fourier transform to the volume, apply the threshold, apply an inverse 3D Fourier transform, then restore the original live traces. The 3D Fourier transform requires a Fourier transform in time, then two sets of Fourier transforms in the two spatial directions. Since all the samples in the time directions are either replaced by the original values or interpolated, the Fourier transforms in time may be done only twice, once at the beginning of the process and once at the end. In this case, each iteration would involve only the spatial Fourier transforms. This eliminates a need for the calculation of the Fourier transforms in time for each iteration. Using this approach, typically a third or more of the Fourier transform computation could be avoided and this would result in greatly reduced runtimes.

Of course, there are cases where the full 3D Fourier transform might still be needed. If only partial windows within the traces are to be interpolated, the full 3D transform would preferably be performed so that all the original samples may be inserted. This could be useful, for example, in cases where short muted zones are being interpolated.

Interpolation of seismic data with a POCS algorithm as taught herein can produce high quality interpolation results. However, it is possible to reduce the computational costs still further and to make the interpolations more reliable through some modifications to the preferred algorithm. For example, the POCS algorithm is suitable for parallelization in several different ways. First, the Fourier transforms that are utilized in the preferred embodiment can readily be parallelized according to methods well known to those of ordinary skill in the art. Additionally, a more direct method of parallelization would be to break the full dataset being interpolated into sub-volumes, and process each sub-volume separately. Each sub-volume involves a significant amount of computation so relatively little inter-processor communication will be needed. This makes for a very efficient parallelization. Since a typical 3D volume could potentially be divided into several thousand sub-volumes, parallelization across these sub-volumes could be effected using several hundred processors. Further modifications might include optimizing the threshold calculations, allowing for aliased data, allowing the algorithm to skip unneeded Fourier transforms, parallelization, etc., each of which could potentially make the method more practical and robust.

In addition to the threshold scheduling algorithm and parallelizing the POCS computation discussed previously, there are other techniques that might be employed to increase the computational efficiency of the instant method. For example, if a window has only a few traces that are to be interpolated, the number of iterations may be reduced. Windows with large numbers of missing traces will need the full number of iterations to generate a quality interpolation. Thus, windows might be selected in such a way as to minimize the number of traces therein that require interpolation. Those of ordinary skill in the art will readily be able to devise other methods of reducing the computational load required by the instant method.

According to still another preferred embodiment, there is provided a method of POCS substantially as described above, but wherein the threshold schedule is a series of increasing frequencies. In this case, the POCS calculations during the initial iterations will preferably be limited to the lowest temporal (spatial, etc.) frequencies. As iteration count increases, high frequency information will be increasingly added to the mix.

Figure 11:
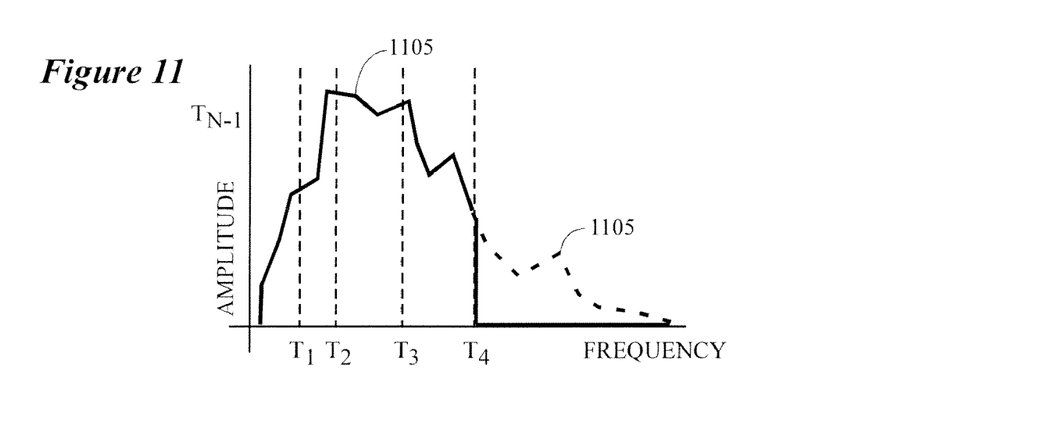
FIG. 11 contains another illustration of how the thresholds might be chosen in another preferred embodiment.

FIG. 11 contains a representation of an amplitude spectrum for a single seismic trace. As is suggested by this figure, in this embodiment the threshold series $T_1, \ldots, T_N$ is a series of increasing frequencies. Preferably, during the first few iterations, only frequencies up to $T_1$ will be utilized, with higher frequencies being set to be equal to a small value such as zero. Then, preferably after the algorithm has shown some amount of convergence the threshold will be increased to $T_2$ (and, then $T_3$, etc.), thereby allowing more high frequency spectral information into the computation. FIG. 11 illustrates the general appearance of a trace spectrum 1105 when the threshold is equal to $T_4$. The portion of the spectrum that is represented by a dashed line has been set equal to zero for the current iteration.

Finally, it should be noted that many imaging algorithms require spatial sampling that is finer than can practically be collected. This instant invention provides an efficient means of generating the necessary traces by interpolating the required traces from the acquired traces.

CONCLUSIONS

Those of ordinary skill in the art will recognize that although the preferred embodiment utilizes a standard sine and cosine based Fourier transform (and its associated spectral values), that is not an absolute requirement. Indeed, there are any number of basis functions that could be used instead. All that is required is that the seismic data be expressible in terms of the coefficients of some basis function. For example, in some variations, instead of a Fourier-based frequency analysis, some other function might be used (e.g., Walsh transforms, wavelet transforms, various Radon transforms, etc.). Those of ordinary skill in the art will readily see how these coefficients could be used for purposes of interpolation in the same manner as the Fourier coefficients discussed previously. Thus, when the terms "frequency spectrum", "amplitude spectrum", or "Fourier components are used herein, that term should be broadly construed to include any collection of coefficients from a discrete transform that can be used to at least approximately reconstruct the seismic data from which the transform was calculated. Further, when the terms "transform" and "transform spectrum" are used herein, those terms should similarly be construed to include any digital transformation that results in a collection of coefficients that are invertible to at least approximately reconstruct the original seismic data. The transform spectrum will be understood to be the collection of coefficients produced by the transform.

Although the invention disclosed herein was discussed almost exclusively in terms of seismic traces organized into "CMP" gathers, that was done for purposes of specificity only and not out of any intent to limit the instant invention to operation on only that sort of seismic data. So, within the text of this disclosure, the terms seismic trace and CMP gather are used in the broadest possible sense of those terms, and they are meant to apply to conventional 2D and 3D traces and CMP gathers, as well as to other sorts of gathers which might include, without limitation, CRP gathers, CCP gathers (i.e., "common conversion point" gathers), CACP ("common asymptotic conversion point") gathers, common offset gathers, common shot/receiver gathers, etc, the most important aspect of a "gather" being that it represents an organized collection of unstacked seismic traces from either a 2D or 3D survey all of which have at least one subsurface image point in common.

As was mentioned previously, a typical seismic surveys may thought of as consisting of five dimensions, i.e., time (or z), x, y, shot-receiver offset in x, and shot-receiver offset in y. This method taught herein can easily be extended from two dimensions into three, four, five, six, or even more dimensions by those of ordinary skill in the art (e.g., a 6D survey is a prestack time-lapse 3D survey). Using more dimensions typically allows a more accurate and robust method of interpolation, although the computation cost tends to increase with dimensionality.

Further, in the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons. By way of example only, the same approach described herein could potentially be used to process and/or analyze multi-component seismic data, shear wave data, converted mode data, cross well survey data, full waveform sonic logs, controlled source or other electromagnetic data (CSEM, t-CSEM, etc.), or model-based digital simulations of any of the foregoing. Additionally, the methods claimed herein after can be applied to mathematically transformed versions of these same data traces including, for example: filtered data traces, migrated data traces, frequency domain Fourier transformed data traces; transformations by discrete orthonormal transforms; instantaneous phase data traces, instantaneous frequency data traces, quadrature traces, analytic traces; etc. In short, the process disclosed herein can potentially be applied to a wide variety of types of geophysical time series, but it is preferably applied to a collection of spatially related time series. Thus, when the term "seismic trace" or "trace" is used herein, those terms should be broadly construed to include traditional seismic traces as well as any of the foregoing.

Finally, the instant algorithm would certainly be suitable for use in subject matters outside of earth exploration, as it provides a general method of improving the computational efficiency of interpolation algorithms that rely on POCS.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of exploration for hydrocarbons within a predetermined volume of the earth containing structural and stratigraphic features conducive to the generation, migration, accumulation, or presence of said hydrocarbons, comprising the steps of:
   (a) accessing a digital representation of a seismic survey that images at least a portion of said predetermined volume of the earth;
   (b) selecting at least a portion of said seismic survey, thereby selecting a plurality of seismic traces;
   (c) selecting at least one target seismic trace proximate to said plurality of seismic traces, said plurality of seismic traces and said at least one target seismic trace together comprising a seismic data set;
   (d) calculating a frequency spectrum from each seismic trace in said seismic data set, each of said frequency spectrum being comprised of a plurality of spectral values;
   (e) selecting a plurality of spectral values from each of said frequency spectrum;
   (f) determining a distribution of said selected plurality of spectral values from each of said frequency spectrum;
   (g) using at least said distribution to obtain a threshold schedule, said threshold schedule at least approximately dividing said distribution into equal-energy partitions;
   (h) using at least said threshold schedule and said plurality of seismic traces to calculate a projection onto convex sets (POCS) interpolation of said at least one target seismic trace, thereby producing at least one interpolated target seismic trace; and,
   (i) using at least a portion of said seismic survey and said at least one interpolated target seismic trace to explore for hydrocarbons within the predetermined volume of the earth, and
   wherein at least one of (d), (f), (g), or (h) is performed on one or more computers.

2. The method of exploration for hydrocarbons within a predetermined volume of the earth according to claim 1, wherein said threshold schedule comprises a plurality of threshold values, each of said plurality of threshold values corresponding to a different frequency, and wherein step (h) comprises the step of:
   (h1) calculating a threshold schedule by placing in increasing numerical order said plurality of threshold values, and,
   (h2) using at least said threshold schedule and said plurality of seismic traces to calculate a POCS interpolation of said at least one seismic target trace, thereby producing at least one interpolated target seismic trace.

3. The method of exploration for hydrocarbons within a predetermined volume of the earth according to claim 1, further comprising the step of:
   (j) writing at least one of said at least one interpolated target seismic trace to computer storage.

4. The method according to claim 3, wherein said computer storage is selected from a group consisting of a magnetic disk, a magnetic tape, an optical disk, a magneto-optical disk, RAM, and non-volatile RAM.

5. The method according to claim 1, further comprising the step of:
(j) viewing at least one of said at least one interpolated target seismic trace on a display device.

6. A method of exploration for hydrocarbons within a predetermined volume of the earth containing structural and stratigraphic features conducive to the generation, migration, accumulation, or presence of said hydrocarbons, comprising the steps of:
(a) accessing at least a portion of a digital representation of a seismic survey that images at least a portion of the predetermined volume of the earth, said accessed portion of said digital representation of the seismic survey comprising a plurality of seismic traces;
(b) calculating a Fourier transform spectrum from each of said plurality of seismic traces, thereby producing a plurality of spectral data values, said plurality of spectral values having a frequency distribution associated therewith;
(c) determining a threshold schedule from said frequency distribution of said spectral data values, said threshold schedule being chosen to at least approximately divide said frequency distribution into a plurality of equal energy intervals;
(d) selecting at least one target location proximate to said seismic survey;
(e) using said threshold schedule and plurality of seismic traces to calculate a projection onto convex sets (POCS) interpolation at said target location, thereby producing at least one interpolated target seismic trace; and,
(f) using said digital representation of a seismic survey and said at least one interpolated target seismic trace to explore for hydrocarbons within the predetermined volume of the earth, and
wherein at least one of (b), (c), or (e) is performed on one or more computers.

7. The method of exploration for hydrocarbons within a predetermined volume of the earth according to claim 1, further comprising the step of:
(g) writing at least one of said at least one interpolated target seismic trace to computer storage.

8. The method according to claim 7, wherein said computer storage is selected from a group consisting of a magnetic disk, a magnetic tape, an optical disk, a magneto-optical disk, RAM, and non-volatile RAM.

9. The method according to claim 1, further comprising the step of:
(g) viewing at least one of said at least one interpolated target seismic trace on a display device.

10. A method of exploration for hydrocarbons within a predetermined volume of the earth containing structural and stratigraphic features conducive to the generation, migration, accumulation, or presence of said hydrocarbons, comprising the steps of:
(a) accessing a plurality of traces from a seismic survey that images at least a portion of the predetermined volume of the earth;
(b) calculating a transform spectrum from each of said plurality of seismic traces, each of said transform spectrum comprising a plurality of spectral values;
(c) using at least a portion of said plurality of spectral values from each of said plurality of seismic traces to determine a distribution;
(d) using at least said distribution to obtain a threshold schedule, said threshold schedule at least approximately dividing said distribution into equal-energy intervals;
(e) selecting at least one target location proximate to said seismic survey;
(f) using said threshold schedule and said plurality of seismic traces to calculate a projection onto convex sets (POCS) interpolation of said at least one target seismic trace, thereby producing at least one interpolated target seismic trace; and,
(g) using at least a portion of said plurality of seismic traces and said at least one interpolated target seismic traces to explore for hydrocarbons within the predetermined volume of the earth, and
wherein at least one of (b), (c), (d), or (e) is performed on one or more computers.

11. The method of exploration for hydrocarbons within a predetermined volume of the earth according to claim 10, further comprising the step of:
(h) writing at least one of said at least one interpolated target seismic trace to computer storage.

12. The method according to claim 11, wherein said computer storage is selected from a group consisting of a magnetic disk, a magnetic tape, an optical disk, a magneto-optical disk, RAM, and non-volatile RAM.

13. The method according to claim 10, further comprising the step of:
(h) viewing at least one of said at least one interpolated target seismic traces on a display device.

14. The method according to claim 10, wherein step (b) comprises the step of:
(b1) calculating using a discrete orthonomal transform spectrum from each of said plurality of seismic traces.

15. The method of geophysical exploration according to claim 14 wherein said discrete orthonormal transform is selected from a group consisting of a Fourier transform, a fast Fourier transform, a discrete Fourier transform, a Radon transform, a cosine transform, a sine transform, a tau-p transform, and a Walsh transform.

* * * * *